United States Patent
Skourup et al.

(10) Patent No.: US 8,786,399 B2
(45) Date of Patent: Jul. 22, 2014

(54) COMPUTER IMPLEMENTED METHOD TO DISPLAY TECHNICAL DATA FOR MONITORING AN INDUSTRIAL INSTALLATION

(75) Inventors: Charlotte Skourup, Drammen (NO); Siri Breen, Zürich (CH); Nicolas-Alexander Hall, Oslo (NO)

(73) Assignee: ABB Research Ltd., Zürich (CH)

( * ) Notice: Subject to any disclaimer, the term of this patent is extended or adjusted under 35 U.S.C. 154(b) by 638 days.

(21) Appl. No.: 12/594,053

(22) PCT Filed: Mar. 27, 2008

(86) PCT No.: PCT/EP2008/053616
§ 371 (c)(1),
(2), (4) Date: Apr. 22, 2010

(87) PCT Pub. No.: WO2008/119727
PCT Pub. Date: Oct. 9, 2008

(65) Prior Publication Data
US 2010/0207719 A1    Aug. 19, 2010

(30) Foreign Application Priority Data
Mar. 30, 2007   (EP) .................................. 07105413

(51) Int. Cl.
*G03H 1/00*  (2006.01)
*G03H 1/08*  (2006.01)
*G11B 7/00*  (2006.01)
*H04N 5/89*  (2006.01)
*H04N 13/00*  (2006.01)

(52) U.S. Cl.
USPC .................. 340/3.7; 359/1; 359/9; 369/103; 348/40

(58) Field of Classification Search
USPC ................ 340/3.7; 353/7; 359/1, 9; 369/103; 348/40
See application file for complete search history.

(56) References Cited

U.S. PATENT DOCUMENTS 4,359,758 A * 11/1982 Teacherson .................... 348/40
4,834,473 A *  5/1989 Keyes et al. ..................... 359/1
(Continued)

FOREIGN PATENT DOCUMENTS

| CN | 86108039 A | 1/1988 |
|---|---|---|
| CN | 1806260 A | 7/2006 |
| EP | 0242481 A | 10/1987 |
| WO | WO-00/60424 A | 10/2000 |
| WO | WO-2004/109603 A1 | 12/2004 |

OTHER PUBLICATIONS

Office Action from the Patent Office of the People's Republic of China, dated Jun. 22, 2011, issued in connection with counterpart Chinese Patent Application No. 200880015595.0 (with English translation).

(Continued)

*Primary Examiner* — Daniel Wu
*Assistant Examiner* — Mohamed Barakat
(74) *Attorney, Agent, or Firm* — Venable LLP; Eric J. Franklin

(57) ABSTRACT

A computer implemented method to display an industrial installation, which display may also display information about an event or an alarm in the installation. The method includes displaying an image which appears to the viewer to be a three dimensional holographic image including a view of the industrial installation. The image may also include one or more points in three dimensional space and which point or points are each mapped to a corresponding point or position in the industrial installation. A pointing device for actively indicating position on the image reflecting objects or positions in the installation is also described.

24 Claims, 3 Drawing Sheets

(56) References Cited

U.S. PATENT DOCUMENTS

| | | | | |
|---|---|---|---|---|
| 5,148,310 | A * | 9/1992 | Batchko | 359/479 |
| 5,777,760 | A * | 7/1998 | Hays et al. | 359/7 |
| 5,777,896 | A * | 7/1998 | Arita et al. | 702/185 |
| 5,982,342 | A * | 11/1999 | Iwata et al. | 345/7 |
| 6,195,185 | B1 * | 2/2001 | Shirakura et al. | 359/35 |
| 6,198,555 | B1 * | 3/2001 | Kurokawa et al. | 359/28 |
| 6,483,461 | B1 * | 11/2002 | Matheney et al. | 342/463 |
| 7,126,730 | B2 * | 10/2006 | Halevy-Politch et al. | 359/15 |
| 7,715,074 | B2 * | 5/2010 | Yoshikawa et al. | 359/24 |
| 7,804,631 | B2 * | 9/2010 | Szarvas et al. | 359/10 |
| 8,036,072 | B2 * | 10/2011 | Lin et al. | 369/44.23 |
| 2005/0275942 | A1 * | 12/2005 | Hartkop et al. | 359/464 |

OTHER PUBLICATIONS

Navab, Nassir, "Industrial Augmented Reality (IAR): Challenges in Design and Commercialization of Killer Apps," *Proceedings of the Second IEEE and ACM International Symposium on Mixed and Augmented Reality* (*ISMAR*), pp. 11-15, Oct. 10, 2003.

PCT/ISA/210—International Search Report—Jul. 23, 2008.

PT/ISA/237—Written Opinion of the International Searching Authority—Jul. 23, 2008.

PCT/IPEA/408—Written Opinion of the International Preliminary Examining Authority—Mar. 5, 2009.

\* cited by examiner

COMPUTER IMPLEMENTED METHOD TO DISPLAY TECHNICAL DATA FOR MONITORING AN INDUSTRIAL INSTALLATION

CROSS-REFERENCE TO RELATED APPLICATIONS

This application claims priority to European patent application 07105413.4 filed 30 Mar. 2007 is the national phase under 35 U.S.C. §371 of PCT/EP2008/053616 filed 27 Mar. 2008.

TECHNICAL FIELD

The invention concerns methods and systems for remote monitoring of process equipment and process objects in an industrial control system. In particular the invention relates to monitoring of processes in oil and gas installations, production platforms and processing facilities.

TECHNICAL BACKGROUND

Today, most industrial installations and production facilities have modern and effective systems for data acquisition and storage with eg fiber-optic communications, databases, and so on. A problem is that users are often not able to extract all the information that is hidden in the acquired data, because in part, the amount of process data is enormous. Even though historical data is easily available, the user may need assistance help to locate process segments behaving abnormally, to gather information about that, and to arrive at a diagnosis of a condition or status of a process or equipment.

In the field of process control in industrial plants IT is used as a strategic tool to make work tasks and decision processes more efficient. For example in the extended oil and gas sector, an extensive reallocation of work tasks between sea and land and between operators and suppliers is underway. The result includes new work processes where personnel, often in different locations, interact using IT and live data integrated in the work processes. Use of IT creates opportunities in control, monitoring and maintenance in the form of new advanced functions. A greater degree of automation of functions currently handled manually, i.e. data collation, report generation, planning, initiation, notification and coordination of tasks is developing.

Common ways of presenting data is mostly done using desktop computer screens, which limit the user to interact with the system in 2D, using keyboard, mouse or similar to browse through a series of process pictures and related data. Use of desktop screens also limits the numbers of users and therefore hinders collaboration possibilities between local and/or remote users.

SUMMARY OF THE INVENTION

According to an aspect of the present invention an improvement is provided in the form of an improved method to generate a display of an industrial installation or part thereof including dynamic information about an event or an alarm, location of personnel, an/or position of a process equipment which method comprises displaying a holographic image comprising a view of said industrial installation, which said view comprises one or more points in three dimensional space and which point or points are each mapped to a corresponding point or position in said industrial installation.

According to an embodiment of the present invention an improvement is provided in the form of an improved method to generate a display of an oil and gas production platform or part thereof including dynamic information about an event or an alarm, location of personnel, an/or position of a process equipment, which method comprises displaying a holographic image comprising a view of said oil and gas production platform installation, which said view comprises one or more points in three dimensional space and which point or points are each mapped to a corresponding point or position in said oil and gas production platform.

According to another embodiment of the present invention an improvement is provided in the form of an improved method to generate a holographic image of an industrial installation or part thereof including information about an event or an alarm, comprising the step of placing a pointer object near to one of the one or more points in the holographic image and identifying the one of the one or more points which has been selected.

According to another embodiment of the present invention an improvement is provided in the form of an improved method to generate a holographic image of an industrial installation or part thereof including information about an event or an alarm, comprising the step of mapping the one of the one or more points which has been identified to an equipment, process section or part thereof in said industrial installation.

According to another embodiment of the present invention an improvement is provided in the form of an improved method to generate a holographic image of an industrial installation or part thereof including information about an event or an alarm comprising the step of mapping the one of the one or more points which has been identified to one or more personnel located at an equipment, process section or part thereof in said industrial installation. This embodiment has the advantage of quickly and efficiently showing whereabouts on an oil platform or in another industrial installation an operator or engineer is located, which facilitates locating and/or treating or evacuating an operator in a problem situation.

The focus of this invention is to present large amounts of process information using holographic images which provide the users with a 3D view of the site. Through the 3D visualization the users get an improved view of the situation and current state of the site. The users can quickly locate all reported events occurring to their respective positions in the platform or installation and access the system to retrieve further information, using a dedicated input device. The users may also select information regarding other objects of interest, such as position and identity of personnel and similar to retrieve more detailed information. The holographic system is used for monitoring and surveillance, and is not directed towards direct control of the site. A typical use is in an onshore operations or support or control room which houses internal experts (e.g. process planners, process engineers, management etc.) and third-party experts.

The invention presents information about an installation comprising many complex processes in a clear and intuitive way, and methods providing access to or interaction with this information. The invention describes:
  presentation of large amounts of process information using holographic images to create a 3D view of the site,
  a device for interacting with the holographic image,
  navigation in the 3D view of the plant or platform and information retrieval communication between the underlying control system and the holographic apparatus generating the holographic images An advantage is the generation of an improved overview of a current state of a given site and a 3-D interface through which to quickly retrieve more detailed information on selected events or objects. The invention allows an unlimited number of viewers to collaborate around the same hologram. This creates a working environment in which all users have the same hologram no matter location, and with different expertise.

Another advantage is the provision of position information for optimising or increasing production, by improved access to monitoring information and for real-time interaction between involved activities and disciplines, e.g. by users monitoring compressors or wells from land, and by contact with users or experts in the field if matters requiring action are discovered. The use of the invention is advantageous for eg interaction rooms used to support work processes between land and sea and between operator and supplier. This is in part because the invention provides an interface that promotes improved user perception of the site, the layout of relevant equipment or sections and the current state. It also supports efficient collaboration, both local and remote.

The operations for which the invention may be applied may also comprise so includes drilling, operations and maintenance or upgrades. Advantageously the invention is adapted for use eg for continuous monitoring and/or support from onshore specialists, both own and suppliers' on a 24-hour basis. The monitoring may also be applied to planning of scheduled operations and s well as planning or guidance for unplanned or critical situations. Thus, for example, a remote expert can see from the holographic image which operator is located closest to a relevant equipment, and guide the operator by eg phone or SMS or computer link to carry out an observation or carrying out a procedure to change a set-point or the like.

A further advantage is reduced operating and maintenance costs at the industrial installation which may be located, as in the case of an oil platform, such that it is time consuming, difficult or dangerous to access, by, with the aid of an embodiment of the invention enabling:

Condition- and campaign-based maintenance
Transferal of administrative, surveillance, management and reviewing activities onshore
Reduced usage of experts offshore
Onshore remote monitoring
Improved efficiency for monitoring and analysis functions
New ways of supporting the fields by centralising tasks, cross-field coordination and specialising service supplies to a larger degree According to an aspect of the present invention an improvement is provided in the form of an improved system for monitoring an industrial installation arranged with computer program means to generate a display of said industrial installation or part thereof including information about an event or an alarm, and a computer, further comprising means for generating a display of a holographic image comprising a view of said industrial installation which said view comprises one or more points in three dimensional space and which point or points are each mapped to a corresponding point or position in said industrial installation.

According to another embodiment of the present invention an improvement is provided in the form of an improved system for monitoring for an industrial installation comprising means for generating a display of a holographic image comprising a view of said industrial installation further comprising means for determining that a pointer object has been placed near to the one of the one or more points in the holographic image and means for identifying the one of the one or more points which as been selected.

According to another embodiment of the present invention an improvement is provided in the form of an improved system for monitoring for an oil and gas production platform, the system comprising means for generating a display of a holographic image comprising a view of said oil platform further comprising optical registration means for determining that a pointer object has been placed near to the one of the one or more points in the holographic image and means for identifying the one of the one or more points which as been selected.

According to another embodiment of the present invention an improvement is provided in the form of an improved system for monitoring for an industrial installation comprising means for generating a display of a holographic image comprising a view of said industrial installation comprising computer program means for mapping the one of the one or more points which has been identified to a process section or part thereof in said industrial installation.

In a preferred embodiment of the methods of the invention one or more methods may be carried out by a computing device comprising one or more microprocessor units or computers. The control unit(s) comprises memory means for storing one or more computer programs for carrying out the improved methods. Preferably such computer program contains instructions for the processor to perform the method as mentioned above and described in more detail below.

BRIEF DESCRIPTION OF THE DRAWINGS

Embodiments of the invention will now be described, by way of example only, with particular reference to the accompanying drawings in which.

DESCRIPTION OF THE EMBODIMENTS

Figure 1:
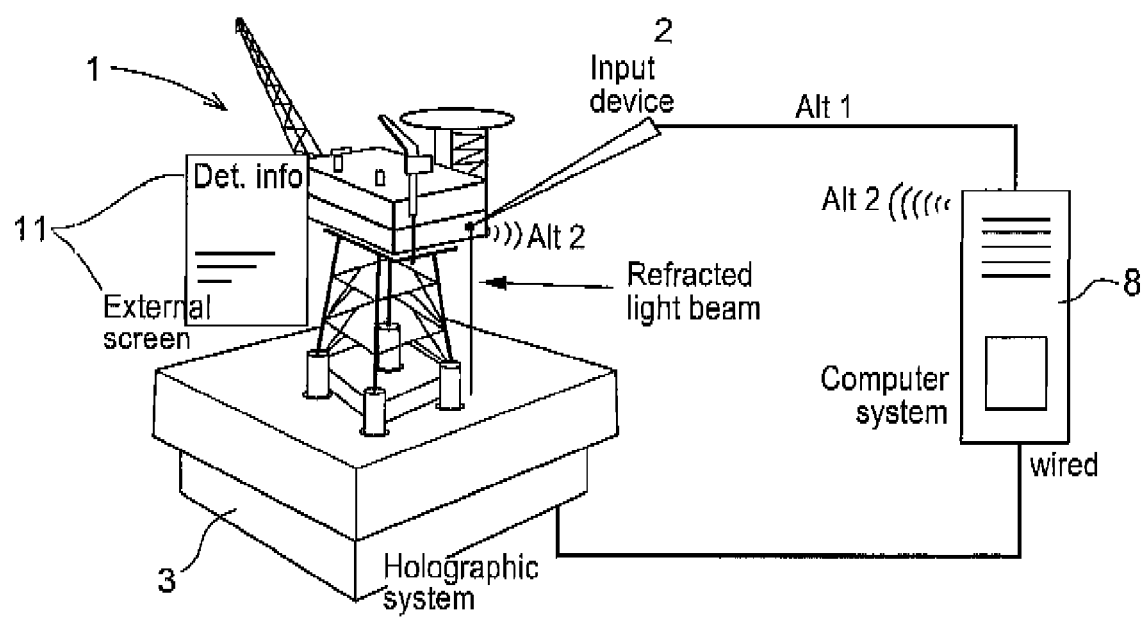
FIG. 1 is a schematic diagram of a holographic user interface for generated and displaying a 3-D view of an oil platform or an industrial installation according to an embodiment of the invention.

FIG. 1 shows an exemplary example of an embodiment of the invention. The figure shows a holographic system 3 for producing holographic images, and a holographic display 1 of an oil production platform. A pointer device 2 is shown positioned for interaction with the holographic image 1. The pointer 2 is shown here connected by a wire or wirelessly to a computer 8 which is also connected to the holographic system 3. A separate display, an external graphic screen 11 is schematically positioned adjacent the holographic image 1.

The system for carrying out the method comprises then a holographic apparatus 3 which generates an holographic image 1, and the device may also comprise light refraction detectors (not shown) or other means which may register where on the holographic image 1 the user "touches", and an input device 2 with which the user may interact with the holographic image and preferably a data server which constantly feeds the holographic apparatus with updated process information.

An oil production platform or another industrial installation is arranged with an industrial control system. As an illustrative example the control system may provide information about a problem of some sort with a given control valve. The problem with the control valve is indicated, eg with the color red marking the position of the control valve in the 3-D image of the holographic image 1. The holographic image displays the relative location of the control valve with the red mark or a flashing red point of light. Clicking on the valve with the input/pointing device results in the control system displaying further information about the control valve and/or event. Further information may, for example, be displayed on an external display such as display 11 of FIG. 1. Thus the user is provided with more information about the relative plant location of the problem valve with immediate access to event information and/or object information accessed from or generated by the control system. The local or remote user receives then an improved delivery of information on which to base further actions.

An enlarged view of a second part of the holographic image that is a view adjacent to or overlapping the view of the process section or part thereof may be generated. The holographic image may be rotated about a vertical axis and providing a view of other parts of the holographic image. The holographic image may be rotated about a non-vertical axis and a view of other parts of the holographic image provided.

Health and security of personnel on an oil platform or in other potentially dangerous industrial installations is a very important issue. For OHSE (Occupational health and Safety) purposes and in the unlikely event of a personnel injuring himself and falling into an unconscious state somewhere in the platform or plant, the hologram will show the location of the injured person and by selecting the object in the hologram, the user will get access to important medical information, such as name, age, gender, blood type, allergies, etc supplied to the display or external display 11 from the control system of the installation.

The output from such examples can be displayed as an overlaying hologram or on an external screen 11. The external screen may be part of the hologram apparatus or a separate device. The benefit of using a 3D visualization of objects in relation to injured personnel or personnel at risk is that it provides a fast way to gather information to identify the location of the person, and to investigate the corresponding necessary assessment and routing of maintenance and emergency personnel to the person and/or to an exit or vehicle access point etc.

The holographic apparatus comprises a light beam generator (typically a laser) which renders the holographic images. The apparatus is also arranged with a light beam detector which detects light beams refracted, reflected or scattered by the tip of the input device 2, which may be an active tip. The detector may for example register the intensity, and thus the length, of the refracted beam. It also registers the x,y-position of the same light beam. A computing device then calculates the spatial position of the "touched" point based on length of the refracted light beam (z-position) and the refracted light beam's x,y-position.

A pointer or an input device 2 connected to the hologram apparatus (wired or wirelessly) to enable manipulation of the hologram (navigation, selection of icons, objects etc.), preferably comprises: a physical pointer device with a wired or wireless connection to the hologram apparatus, a tip or an active tip of the pointer arranged such that it is the only registrable point for the above light beam detector, a control such as a button, scroll wheel or similar on the said device which activates the said beam detector in the hologram apparatus. Hence, the user clicks/turns/scrolls the said control to select the "touched" point. Optionally the pointer device may include a haptic actuator which gives the user haptic feedback when the user "touches" specific targets, events, objects or similar in the holographic image. The haptic actuator is triggered by input from the light beam detector which continuously registers the "touched" points.

An external screen 11 on which detail information on selected targets, events, objects or similar can be displayed. This screen may be part of the holographic image or a separate device. A computer system which is connected to the holographic system, including the hologram apparatus, and which continuously feeds the holographic system with status information on the site (plant, oil platform or similar). The computer system comprises the following;
- a connection to one or more remote servers that allow access to centrally stored information and databases,
- an application which translates the stored information and other relevant data into positions in 3-D space on the graphical images which are fed into and displayed by the holographic system,
- object-specific detail information and data such as electronic manuals, maintenance reports, historical data, personnel data, and similar, which is displayed to the user on the external screen upon selection or request.

Thus, for example, one or more remote experts can see from the holographic image which operator is located closest to a relevant equipment. The expert or experts may then discuss an event or alarm, and may guide the operator by eg phone or SMS or computer link in carrying out an observation or carrying out a procedure to change check a setting, check or adjust a set-point or the like.

The system can be configured in different ways.

Figure 2:
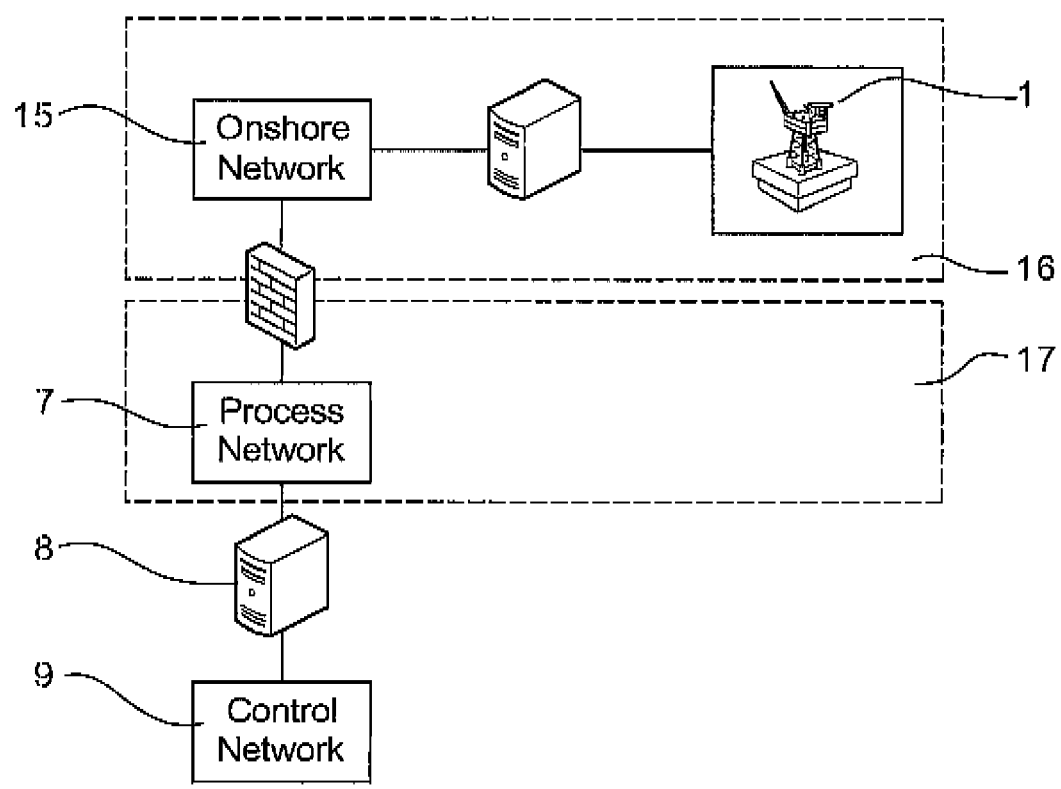
FIG. 2 is a block diagram of the architecture of an embodiment of the invention.

FIG. 2 shows an architecture comprising an embodiment of the invention. The figure shows a holographic image 1 of an oil production platform, connected to an onshore network 15. The onshore network is connected via secure data communication arrangements to a process network 7. The process network is further connected to one or more computers 8 and a control network 9, or process control network, which controls the oil platform or other industrial installation. The onshore network 16 comprising the holographic image may be established within a relatively low security arrangement. This is in comparison with the data communication and process control arrangements 17 for an oil platform or other industrial installation which requires highly secure data and computing networks.

Figure 3:
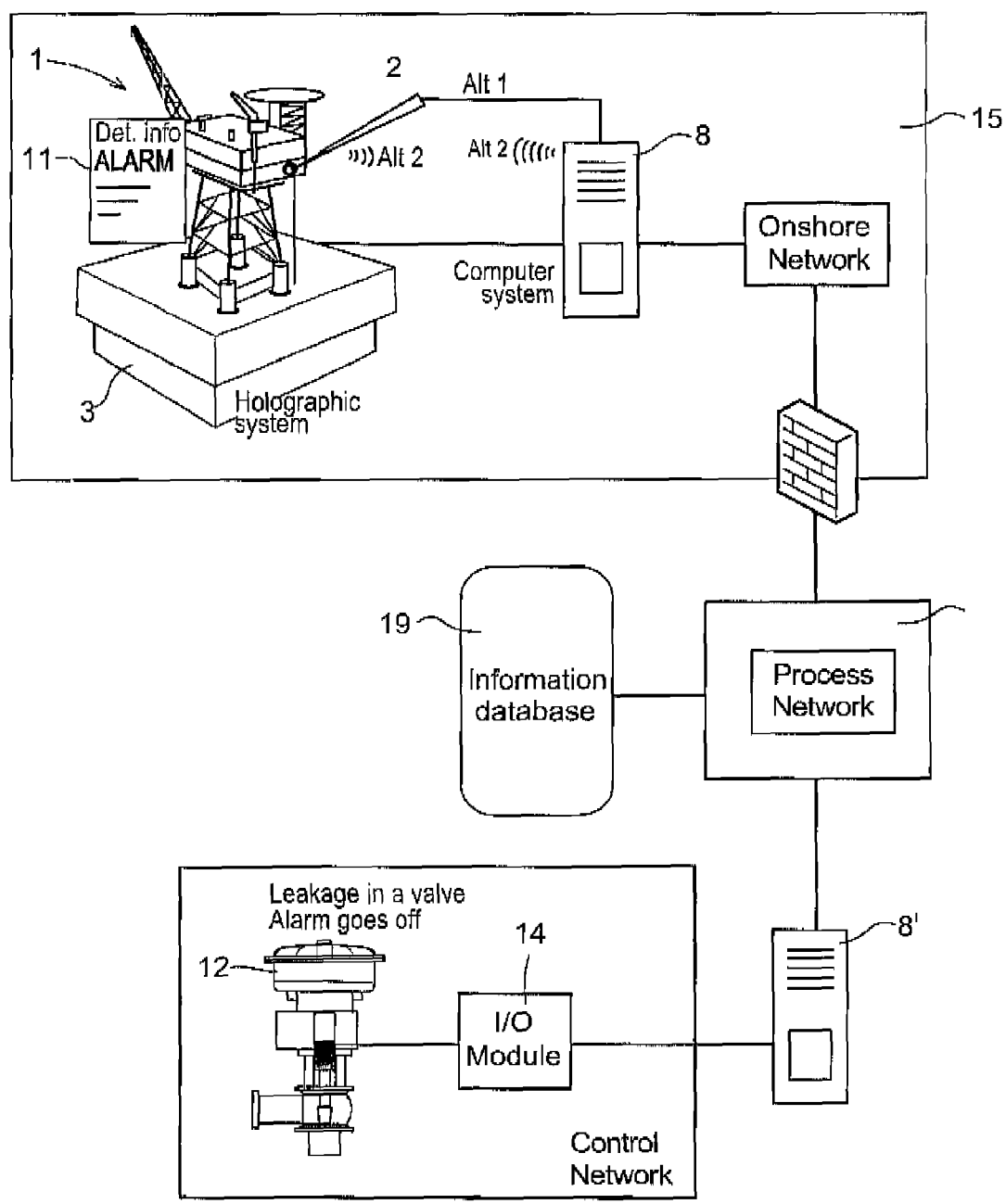
FIG. 3 is a block diagram of an architecture for a method and system according to an embodiment of the invention.

FIG. 3 shows another architecture comprising an embodiment of the invention. It shows the holographic image 1 generated by holographic device 3 and pointer 2 of FIG. 1. At the oil platform or other industrial installation a leakage problem with a control valve 12 connected via an I/O module or node 14 to the process network 7 results in an alarm in a control system. The control system is also connected to data storage containing data on equipment, processes and process history of the oil platform or industrial installation. Thus the position in the installation of the object associated with the alarm or event reported in the control system may be mapped to a 3-D model, the position in 3-D space calculated for the position of that event or alarm object, control valve 12 in this example, in the 3-D model, and the corresponding position then shown marked on the holographic image 1. For example as a coloured light or flashing light or similar. In this way the location of an object which is the subject of an event or alarm reported in the control system is shown in its 3-D position in space on the holographic image.

Methods of the invention may be supervised, controlled or carried out by one or more computer programs. One or more microprocessors (or processors or computers) comprise a central processing unit CPU connected to or comprised in one or more of the above computers or computer systems, which processors or computers perform the steps of the methods according to one or more aspects of the invention, as described for example in reference to the Figures. It is to be understood that the computer programs for carrying out methods according to the invention may also be run on one or more general purpose industrial microprocessors or PLCs or computers instead of one or more specially adapted computers or processors.

The computer program comprises computer program code elements or software code portions that make the computer or processor perform the methods using equations, algorithms, data, stored values, calculations, synchronisations and the like for the methods previously described. A part of the program may be stored in a processor as above, but also in a ROM, RAM, PROM, EPROM or EEPROM chip or similar memory means. The or some of the programs in part or in whole may also be stored locally (or centrally) on, or in, other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such as Sony memory Stick™, a USB memory stick and other removable flash memories, hard drives etc. may also be used. The program may also in part be supplied or updated from a data network, including a public network such as the Internet.

It should be noted that while the above describes exemplifying embodiments of the invention, there are several variations and modifications which may be made to the disclosed solution without departing from the scope of the present invention as defined in the appended claims.

The invention claimed is:

1. A computer implemented method to generate a display of an industrial installation including information about an event or an alarm, the method comprising:
    displaying on at least one display device a holographic image comprising a view of said industrial installation, wherein the view comprises at least one point in three dimensional space;
    mapping the at least one point to a corresponding point or position in said industrial installation;
    placing by a user a pointer object near to one of the at least one point in the holographic image;
    detecting a change in a transmission, reflection, refraction or scattering of at least one ray of light making up the holographic image; and
    mapping the changed or disrupted at least one ray of light to at least one point in three dimensional space and subsequently to at least one point in three dimensional space in a computer implemented three dimensional model of said industrial installation.

2. The method according to claim 1, further comprising:
    generating an enlarged view of a first part of the holographic image containing the process section or part thereof associated with the at least one point that has been selected.

3. The method according to claim 1, further comprising:
    generating an enlarged view of a second part of the holographic image which is a view adjacent to or overlapping the view of the process section or part thereof.

4. The method according to claim 1, further comprising:
    generating a display comprising information about a selected equipment, process or operator.

5. The method according to claim 1, further comprising:
    rotating the holographic image about a vertical axis and providing a view of other parts of the holographic image.

6. The method according to claim 1, further comprising:
    rotating the holographic image about a non-vertical axis and providing a view of other parts of the holographic image.

7. The method according to claim 1, further comprising:
    detecting a change or disruption of the at least one ray of light making up the holographic image; and
    identifying the one of the at least one point in three dimensional space that has been selected.

8. The method according to claim 1, further comprising:
    displaying at least one point in three dimensional space that represents the event or the alarm in said industrial installation.

9. The method according to claim 8, further comprising:
    selecting at least one of the at least one point in three dimensional space representing the event or the alarm; and
    generating a display of information about the event or alarm in said industrial installation.

10. The method according to claim 1, further comprising:
    mapping the one of the at least one point that has been identified to at least one personnel located at an equipment, process section or part thereof in said industrial installation; and
    generating a display of information on the holographic image showing a location of each of personnel on a platform.

11. A computer program product, comprising:
    a non-transitory computer readable medium; and
    software code elements recorded on the non-transitory computer readable medium which when read into a computer or processor will cause the computer or processor to carry out a method to retrieve and display technical data for an industrial device using a computer program for control, the method comprising displaying on at least one display device a holographic image comprising a view of said industrial installation, wherein the view comprises at least one point in three dimensional space, mapping the at least one point to a corresponding point or position in said industrial installation, placing by a user a pointer object near to one of the at least one point in the holographic image, detecting a change in a transmission, reflection, refraction or scattering of at least one ray of light making up the holographic image, and mapping the changed or disrupted at least one ray of light to at least one point in three dimensional space and subsequently to at least one point in three dimensional space in a computer implemented three dimensional model of said industrial installation.

12. A control system for an industrial installation, the control system comprising:
    a computer program to generate a display of an industrial installation including information about an event or an alarm, and
    a computer configured to generate on at least one display device a display of a holographic image comprising a view of said industrial installation, said view comprising at least one point in three dimensional space, wherein the at least one point is mapped to a corresponding point or position in said industrial installation, wherein when a user places a pointer object near to one of the at least one point in the holographic image, at least one point is mapped to a detected change in a transmission, reflection, refraction or scattering of at least one ray of light making up the holographic image and subsequently to at least one point in three dimensional space in a computer implemented three dimensional model of said industrial installation.

13. The control system according to claim 12, further comprising:
a determining element configured to determine that a pointer object has been placed by a user near to the one of the at least one point in the holographic image; and
an identification element configured to identify the at least one point that has been selected by the user.

14. The control system according to claim 12, further comprising:
an optical register configured to determine whether a pointer object has been placed near to the at least one of the at least one point in the holographic image; and
an identification element configured to identify the at least one of the at least one point which has been selected.

15. The control system according to claim 12, further comprising:
a computer program configured to map the at least one of the at least one point which has been identified to at least one equipment, process section or part thereof in said industrial installation or to at least one personnel located at an equipment, process section or part thereof in said industrial installation.

16. The control system according to claim 12, further comprising:
a computer-implemented 3-D model of said industrial installation.

17. The control system according to claim 12, further comprising:
a link to at least one of the control system for said industrial installation or at least one database storing data for said industrial installation.

18. The system according to claim 12, further comprising:
a computer program stored in a memory device or on a non-transitory computer readable medium which when read into a computer or processor will cause the computer or processor to carry out one or more instructions for a method to retrieve and display technical data for an industrial device, the method comprising displaying on at least one display device a holographic image comprising a view of said industrial installation, wherein the view comprises at least one point in three dimensional space, mapping the at least one point to a corresponding point or position in said industrial installation, placing by a user a pointer object near to one of the at least one point in the holographic image, detecting a change in a transmission, reflection, refraction or scattering of at least one ray of light making up the holographic image, and mapping the changed or disrupted at least one ray of light to at least one point in three dimensional space and subsequently to at least one point in three dimensional space in a computer implemented three dimensional model of said industrial installation.

19. A holographic user interface for providing a display of an industrial installation, or part thereof, including information about an event or an alarm, wherein a view of said industrial installation comprises displayed on at least one display device a holographic image, wherein the view comprises at least one point in three dimensional space, wherein the at least one point is each mapped to a corresponding point or position in said industrial installation, wherein a pointer object is placed by a user near to at least point in the holographic image, wherein at least one detected change in a transmission, reflection, refraction or scattering of at least one ray of light making up the holographic image is mapped to at least one point in three dimensional space and subsequently to at least one point in three dimensional space in a computer implemented three dimensional model of said industrial installation.

20. The method according to claim 1, wherein the method carries out any from the group of: providing an overview of a status of the installation, checking a status of an industrial device, checking a process variable.

21. The method according to claim 1, wherein the method carries out any from the list of: checking a status of an industrial device, tuning a process, checking a process variable, checking the event or the alarm, checking a status of an oil platform.

22. The method according to claim 1, further comprising:
mapping the one of the at least one point that has been identified to an equipment, process section or part thereof in said industrial installation.

23. The method according to claim 1, further comprising:
mapping the one of the at least one point that has been identified to at least one personnel located at an equipment, process section or part thereof in said industrial installation.

24. The method according to claim 4, further comprising:
generating, on a display device that is separate from the at least one display device displaying the holographic image, a display comprising a graphic user interface navigation element.

* * * * *